United States Patent
Stewart et al.

(10) Patent No.: US 10,474,365 B2
(45) Date of Patent: Nov. 12, 2019

(54) SYSTEM AND METHOD FOR FILE PROCESSING FROM A BLOCK DEVICE

(71) Applicant: Stroz Friedberg, LLC, New York, NY (US)

(72) Inventors: Jon Stewart, Arlington, VA (US); Geoffrey Black, Arlington, VA (US); Joel Uckelman, Heidelberg (DE)

(73) Assignees: STROZ FRIEDBERG, LLC, New York, NY (US); CYBER TECHNOLOGY SERVICES, INC., Manassas, VA (US)

( * ) Notice: Subject to any disclaimer, the term of this patent is extended or adjusted under 35 U.S.C. 154(b) by 285 days.

(21) Appl. No.: 14/165,185

(22) Filed: Jan. 27, 2014

(65) Prior Publication Data

US 2014/0215154 A1  Jul. 31, 2014

Related U.S. Application Data

(60) Provisional application No. 61/756,998, filed on Jan. 25, 2013.

(51) Int. Cl.
  *G06F 12/00* (2006.01)
  *G06F 3/06* (2006.01)
(52) U.S. Cl.
  CPC ............ *G06F 3/061* (2013.01); *G06F 3/0659* (2013.01); *G06F 3/0676* (2013.01)
(58) Field of Classification Search
  None
  See application file for complete search history.

(56) References Cited

U.S. PATENT DOCUMENTS

| | | | | |
|---|---|---|---|---|
| 4,073,005 A | * | 2/1978 | Parkin | G06F 9/4881 711/147 |
| 5,619,690 A | * | 4/1997 | Matsumani | G06F 3/0601 |
| 5,671,365 A | * | 9/1997 | Binford | G06F 13/126 710/100 |
| 6,292,871 B1 | * | 9/2001 | Fuente | G06F 12/0862 711/128 |
| 9,483,469 B1 | * | 11/2016 | Chiueh | G06F 3/0643 |

(Continued)

OTHER PUBLICATIONS

David A. Patterson et al, "A case for redundant arrays of inexpensive disks (RAID)", pp. 109-116, Published 1988.*

*Primary Examiner* — Jason W Blust
(74) *Attorney, Agent, or Firm* — Gardella Grace P.A.

(57) ABSTRACT

An example system and method includes an electronic memory configured to store electronic data. The system further includes a controller coupled to an electronic storage device including electronic data storage locations arranged in a consecutive sequence on a storage medium and configured to store electronic data corresponding to electronic files in the electronic storage locations and access the electronic storage locations serially according to the consecutive sequence. The controller may be configured to cause the electronic storage device to serially access and transmit to the electronic memory, according to the consecutive sequence, at least some electronic data, cause the electronic memory to store the electronic data as received so that the electronic data of the file forms a complete file, and cause a processor to access the files from the electronic memory upon all electronic data associated with ones of the files having been stored in the electronic memory.

19 Claims, 6 Drawing Sheets

(56) References Cited

U.S. PATENT DOCUMENTS

| | | | | |
|---|---|---|---|---|
| 2010/0082904 A1* | 4/2010 | Juenemann | ......... | G06F 12/0868 711/119 |
| 2010/0095071 A1* | 4/2010 | Shirahige | .............. | G06F 9/3824 711/140 |
| 2012/0254203 A1* | 10/2012 | Stewart | ............... | G06F 21/6209 707/755 |
| 2014/0195699 A1* | 7/2014 | Sokol, Jr. | ................ | G06F 13/18 710/40 |

\* cited by examiner

SYSTEM AND METHOD FOR FILE PROCESSING FROM A BLOCK DEVICE

PRIORITY

This application claims the benefit of priority under 35 U.S.C. § 119(e) to U.S. Provisional Application No. 61/756,998, filed Jan. 25, 2013, which is incorporated herein by reference in its entirety.

TECHNICAL FIELD

The disclosure herein relates generally to file processing from a block device.

BACKGROUND

Electronic storage devices may include devices known in the art as block devices or media devices, such as hard disks, floppy disks, CD-ROMs, DVD-ROMs, and the like. Such block devices may store electronic data files by breaking the files into blocks and storing the individual blocks on a storage medium, such as a magnetic medium or an optical medium. Traditionally, various block devices operate mechanically and may include at least one of a moving or moveable storage medium and an articulable sensor configured to access the data from the storage medium. Non-mechanical, solid state block devices ("SSDs", such as flash drives and the like) are gaining in mass popularity, and often have the ability to out-perform mechanical designs. The blocks corresponding to an individual file may be stored anywhere within the electronic storage device depending on available space. The electronic storage device may include a file system that includes metadata about the files on the electronic storage device, such as the physical location of the blocks for each file on the storage medium. Thus, the blocks corresponding to the same file may be stored in disparate locations on the electronic storage device but reassembled by accessing each of the blocks in turn. In this way, the storage space of the block device may be efficiently utilized.

DRAWINGS

DESCRIPTION

Figure 1:
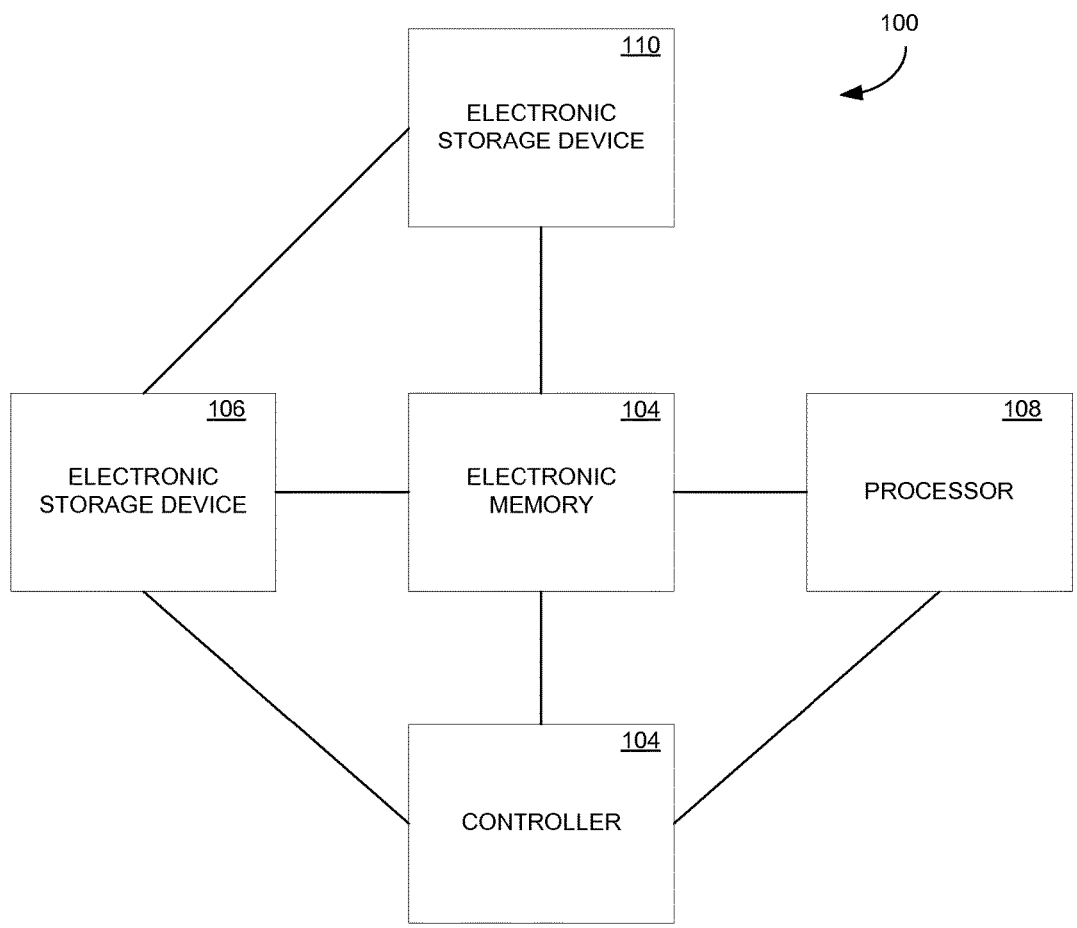
FIG. 1 is a block diagram of a system, in an example embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Although their respective performance characteristics can differ dramatically, for both mechanical and solid state storage devices it is generally the case that reading or writing blocks sequentially leads to higher rates of bandwidth than accessing non-sequential blocks. Additionally, the bandwidth rates of such devices are still far below that of contemporary random access memory in a computer, where there's far less difference for accessing data at disparate locations.

Because the blocks for a given file may be out of physical order on the storage medium, performance penalties may result when seeking around on the electronic storage device, such as by reading off individual files from the device. Examples of contemporary mechanical hard drives have transfer rates approaching one hundred fifty (150) megabytes per second but have seek latencies of eight (8) to ten (10) milliseconds. Thus, in such an example, a single seek command followed by a continuous read could result in reading approximately one hundred fifty (150) megabytes in one (1) second. By contrast, one hundred (100) seek commands in a second may result in little to no data read, with all or most of the second taken up by seek operations. Solid state devices generally have better seek times, often at or below a tenth (0.1) of a millisecond, with peak transfer times generally ranging from 200-600 MB/s, depending on the type of solid state electronic storage technology used. Although the performance penalty for non-sequential I/O is relatively much lower for solid state devices than mechanical devices, peak transfer rates typically still require sequential I/O.

Conventionally, the accessing and investigative analysis of content from block devices is file-based, to the extent that content can be associated with files. That is to say, files are individually accessed from the electronic storage device and analyzed. Such analysis of files that are text-based or substantially text-based may be for language identification, text searching, text indexing, text clustering and summarization, among other potential activities. For graphics files, such analysis may be facial recognition and tagging, pornography detection, geolocation, and so forth. For videos, such analysis may be detection of scene changes/key frames, as well as analysis such as is performed on graphic files. Analysis of compressed archives may include expanding the archives and processing the archives recursively. While various actions can be performed on raw data, complete files may present more varied possibilities for analysis. As file systems do not typically present files in order by physical location on disk, traditional analysis of files therefore entails seeking on the underlying storage device, incurring a performance penalty. Certain contemporary file systems try to prevent fragmentation of individual files, but seeks may nevertheless be necessary between accessing different files via a file system.

Relative to conventional file size, contemporary computing devices, such as personal computers, servers, and the like, may have relatively large amounts of random access memory (RAM) and fast central processing unit (CPU) cores in comparison to file sizes and RAM and CPU resources of older computers. Such computing devices can also exist in networks, with comparatively fast interconnects between them. In a contemporary example, a one (1) gigabit Ethernet link may be about as fast as a hard drive transfer link; as a result, data can be pushed onto a one (1) gigabit Ethernet-based network essentially as fast as the data can be accessed from a hard drive. Given that ten (10) gigabit per second network links already exist, network resources may not be a major limiting factor for data transfer from a media device in many circumstances. Still further, data can, in contemporary computing devices, be transferred to RAM at five (5) to fifteen (15) gigabytes per second, meaning that RAM may be from twenty (20) to one hundred (100) times faster than a contemporary hard disk's maximum throughput.

Systems and methods have been developed that may take advantage of these factors to improve the amount of time consumed in analyzing the files of a block device. It may be advantageous to analyze complete files. Additionally, when a piece of digital media is accessed, such as for the first time, it may be advantageous to preserve a complete copy of the digital media. However, such files may be fragmented on a media device, with portions of the file saved in non-contiguous locations.

Data transfer off of many hard disks and other block devices is essentially serial. Various devices, systems and methods disclosed herein may factor in the serial nature of the output of such devices to promote relatively more efficient performance in reading and processing data off of such devices than may be achieved by conventional seeking on such devices. Data from such devices may be received in a form whereby the data can be processed both relatively conveniently and in parallel. In addition, the data as accessed may be concurrently stored in a second electronic storage device to create, in parallel with the analysis of the first electronic storage device, a copy of the first electronic storage device. In such an example, the copy of the electronic storage device may be completed relatively shortly before or at virtually the same time as the analysis of the electronic storage device is completed.

FIG. 1 is a block diagram of a system 100, in an example embodiment. The system 100 includes a controller 102, an electronic memory 104, a first electronic storage device 106, one or more processors 108, and a second electronic storage device 110. It is to be understood that the various components of the system 100 are optional and that various examples of the system 100 may include more or fewer such components. The system 100 may be included as or within a single device, such as a personal computer or server, may be separate components coupled to one another locally or via network connections, or some combination thereof.

The controller 102 may be any electronic controller that may control the operations of the other components of the system 100. The controller 102 may be one or more processors, microcontrollers, application-specific integrated circuits (ASICs), and the like. The controller 102 may be a part of or include the processor 108, i.e., the same components, such as one or more microprocessors, may perform the role of both the controller 102 and the processor 108, as disclosed herein.

The electronic memory 104 may be an electrically programmable electronic storage device, such as volatile memory (e.g., RAM) and non-volatile memory (e.g., electrically eraseable and programmable read-only memory (EEPROM), such as flash memory, and the like). Alternatively, the electronic memory may be any data storage device that can access data stored thereon faster and/or with less latency than the first electronic storage device 106 may access electronic data stored on the first electronic storage device 106.

The electronic memory 104 may be formed to include an amount of data storage sufficient to manage anticipated electronic files from the electronic storage device 106. As is understood in the art, the amount of data storage in the electronic memory 104 may be scaled to be larger or smaller to accommodate a need or anticipated need. The electronic memory 104 may incorporate one or more types of electronic memory, as detailed above.

The first electronic storage device 106 may be one or more block devices, as disclosed herein. The electronic storage device 106 may access data stored thereon at a slower rate than the electronic memory 104 may access data stored on the electronic memory 104, for instance, according to an average access rate or a maximum access rate. In an example, the electronic storage device 106 is a hard disk.

The processor 108 may be one or more processors, such as microprocessors, ASICs, and the like. The processor 108 may be a multicore processor or may be distributed processors. Multiple processors 108 may be co-located or may be located in multiple physical locations. The processor 108 perform various operations on electronic files as accessed form the electronic memory 104, such as are disclosed above and herein.

The second electronic storage device 110 may optionally be utilized to create a duplicate copy of the first electronic storage device 110. The second electronic storage device 110 may take advantage of the fact that the data of the first electronic storage device 106 is being accessed and streamed out relatively quickly and according to the physical sequencing of the data on the first electronic storage device 106, as disclosed herein. As data is serially read off of the first electronic storage device 110 the data may be sent both to the electronic memory 104 and to the second electronic storage device 110. While the electronic memory 104 may contribute to configuring the electronic data for processing as completed files by the processor 108, the second electronic storage device 110 may simply store the electronic data as provided by the first electronic storage device 106 to create an image of the first electronic storage device 106. Thus, the time and effort to duplicate the first electronic storage device 106 may be folded in to the analysis of the data of the first electronic storage device without significant penalty.

Data may be transmitted from the first electronic storage device 106 to the second electronic storage device 110 either directly or by way of the electronic memory 104. In the first case, a command to access data for the electronic memory 104 causes the first electronic storage device 106 to access and transmit data to both the electronic memory 104 and the second electronic storage device 110. In the second case, the electronic storage device 106 may transmit data to the electronic memory 104 which then forwards the data on to the second electronic storage device 110 either as the data is received or in the same or essentially the same order in which the data is received.

Figure 2:
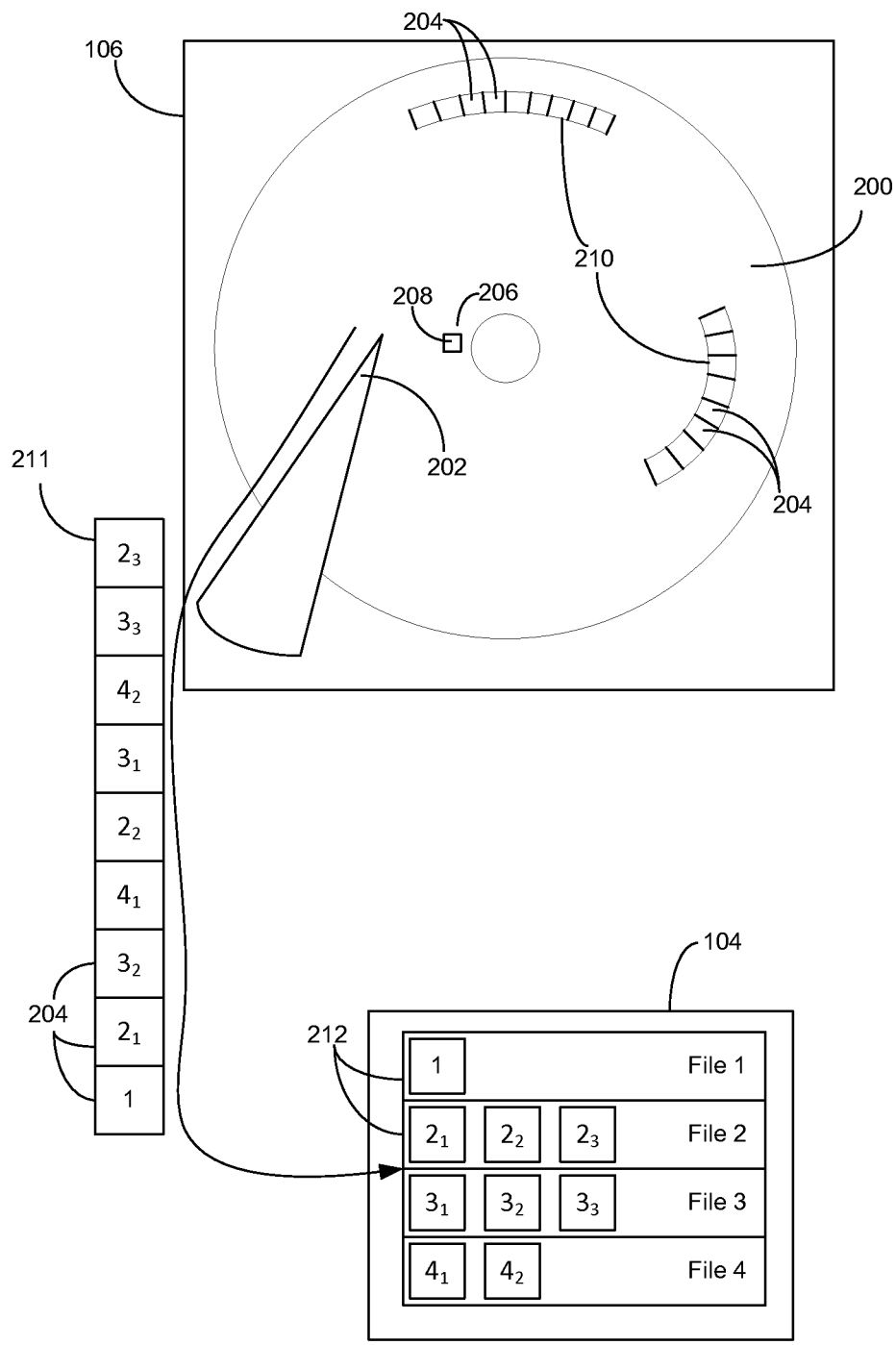
FIG. 2 is an abstracted illustration of the accessing and flow of electronic data within a system, in an example embodiment.

FIG. 2 is an abstracted illustration of the accessing and flow of electronic data within the system 100, in an example embodiment. As illustrated, the electronic data storage 106 is a hard disk, though it is to be understood that the principles disclosed herein apply to other types of block devices. Thus, while the blocks, as disclosed herein, may be arranged according to a physical sequence as on a hard disk, the principles also apply where the physical sequence of the blocks may be less significant than a block address sequence of the blocks, such as on a flash drive. In such examples, a consecutive sequence of the blocks may be understood in terms of either the physical location of the blocks, the block address sequence of the blocks, both the physical and block address sequence, or according to other relevant sequences.

The electronic data storage includes a storage medium 200, such as a metal platter, and a sensor 202 configured to access various physical locations on the storage medium 200. In a conventional hard disk, the storage medium 200 rotates while the sensor 202 is articulable. Between the rotation of the storage medium and the articulation of the sensor 202, various physical locations on the storage medium may be accessed and read. It is noted and emphasized that a conventional hard disk may include multiple sensors 202 per metal platter, e.g., one sensor 202 per side of the platter, and may include multiple platters and logic that permits the storage of data across the various platters and accessible concurrently by the multiple sensors 202. The principles described herein with respect to a single sensor 202 on a single storage medium 200 are readily expandable to any number of sensors 202 and storage media 200 in any of a variety of configurations known in the art.

The storage medium 200 includes blocks 204 of electronic data corresponding to the electronic file stored on the electronic storage device 106. The blocks 204 include individual bits and bytes of electronic data and are stored according to a consecutive sequence on the storage medium 200, as illustrated in the abstract example. The spinning of the storage medium 200 causes individual blocks 204 to pass under the sensor 202 which may read (and in various examples, such as a hard disk, write) the electronic data of the blocks 204 in turn according to the consecutive sequence of the blocks 204 on the storage medium 200. Thus, in the illustrated example, the sensor 202 first reads a block 204 corresponding to File 1, then a block 204 corresponding to File 2, and so forth as illustrated. Thus, blocks 204 and the electronic data contained within the blocks 204 are serially accessed according to the consecutive sequence of the blocks 204 on the storage medium 200.

A seek operation on the electronic device 106 may include receiving a command to access a particular block 204 at a particular physical location on the storage medium 200. Upon receiving the command to access the particular block 204 the electronic storage device 106 may cause the sensor 202 to move from a first position to a second position with respect to the storage medium 200 that allows the sensor 202 to access the desired block 202 as the physical location of the block 204 passes under the sensor 202 because of the spinning of the storage medium 200. As noted above, such a seek operation may, in contemporary hard disks, require approximately eight (8) to ten (10) milliseconds.

In various examples, blocks 204 may be accessed at a relatively high or maximum data rate by minimizing seek operations. In an example, blocks 204 may be accessed by starting at a first physical location 206 and sequentially reading each block 204 according to the consecutive sequence of the blocks 204 on the storage medium 200. The first physical location 206 may be proximate a center of the storage medium 200. Alternatively, the first physical location 206 may be proximate an outer edge of the storage medium 200 or at any location on the storage medium in which a seek operation is not required to reposition the sensor 202 to access a particular block 204. In such an example, the sensor 202 may move to access each block 204 according to the consecutive sequence of the blocks 204 rather than reposition by a seek operation.

While a maximum data rate may be achieved by allowing no seek operations at all, the objectives of a relatively fast accessing of the data on the electronic storage device 106 may be met while still allowing a relatively limited number of seek operations. In various examples, it may be advantageous to identify and access relatively high priority data before accessing relatively low priority data at the expense of increased time as seek operations are utilized to obtain the data. However, the number of seek operations may be limited in order to limit the increase in time.

In an example, a file system 208 on the electronic storage device 106 is optionally analyzed prior to reading some or all of the data files of the blocks 204 off of the electronic storage device 106. The analysis may produce a map to identify physical locations blocks 204 corresponding to certain files on the electronic storage device 106. The analysis may further be utilized to identify files of relatively high priority according to the circumstances in which the electronic storage device 106 is being analyzed. For instance, files may be prioritized according to file type, keywords in a file name, file size, and so forth.

The data on the electronic storage device 106 may be divided into segments 210 of physically contiguous blocks 204 according to the physical location of the associated blocks 204. The division of the data into segments 210 may be on the basis of an analysis of the file system 208 or may be without respect to an analysis of the file system 208. The number of segments may be predetermined or may be selected based on the file system 208 analysis, e.g., to facilitate accessing the relatively higher priority files. In various examples, the number of segments 210 is from approximately ten (10) segments 210 to approximately one thousand (1,000) segments 210, but the total number of segments may be adjustable and selectable based on circumstances.

In various examples, each segment 210 includes the same or essentially the same number of blocks 204. In various examples, the segments 210 are of variable size. In such embodiments, segments may be sized to include certain blocks 204 that correspond to a given file. For instance, a high priority file that includes fragmented blocks 204 may be placed in a large segment 210 so that all of the blocks 204 of the file end up in the same segment 210. Alternatively, it may be inefficient to attempt to place all of the blocks 204 of a very fragmented file in a single segment 210, and as a result the segment 210 may not be sized to include all of the blocks 204 of the high priority file. Alternatively, segments 210 may be formed without respect to the associated files of the blocks 204. The segments 210 may then be prioritized according to the priority of the files associated with the blocks 204 included in the various segments 210.

The segments 210 may be prioritized according to a priority of the files and/or blocks 204 included in the segment 210. In an example, the priority of a segment 210 may correspond to the highest priority of the associated blocks 204 and/or files. Alternative prioritization of segments 210 may be utilized, such as to prioritize segments 210 with relatively large numbers of complete files contained therein. If the file system 208 metadata is obtained, heuristics can be applied to determine which files may contain high value data. The priority heuristic can be based on how likely each segment 210 is to contain high value data.

The segments 210 may be accessed in turn, such as according to the priority of the segments 210, with a seek operation. A seek operation may be utilized to arrive at some or all of the segments 210; if two segments happen to be immediately adjacent to one another both physically and according to the priority of the segments 210 then a seek operation may not be needed. Upon utilizing a seek operation to arrive at the segment 210, the blocks 204 within the segment 210 may be accessed according to the consecutive sequence of the blocks 204 within the segment 210 without a further seek operation. Upon the accessing of each block 204 within the segment 210 a seek operation is utilized to move the sensor 202 to the next highest priority segment.

As the blocks 204 are accessed and read off the electronic storage device 106, the associated data is transmitted as a data stream 211 in the consecutive sequence as on the storage medium 200. The data of the data stream 211 may be stored, at least temporarily, in the electronic memory 104. The data may be stored in different buffers 212 in the electronic memory 104. In various examples, each buffer 212 corresponds to a file, and in an example each buffer 212 corresponds to one and only one file at a time. As each block 204 of data is read from the disk, the block of data is transferred into an appropriate spot in the file's buffer 212. Eventually the buffer 212 fills up when all of the blocks 204 associated with the file are accessed and transmitted to the electronic memory 104, resulting in a complete file in the electronic memory 104 and the associated buffer 212.

In one example, the buffers 212 may each represent a physically contiguous collection of memory cells within the electronic memory 104. In another example, the buffers 212 may be formed of disparately located memory cells within the electronic memory 104 and accessed electronically according to the addresses of the individual memory cells assigned to or associated with each buffer 212. In various examples, the buffers 212 may be physically contiguous unless it is determined that disparately located memory cells may promote more efficient operation, such as by utilizing memory cells that may otherwise be left at least temporarily unusable.

The allocation of the electronic memory 104 may be based on an analysis of the file system 208. For instance, a maximum capacity of electronic memory 104 may be determined; if an amount of electronic memory 104 from one source is determined to be insufficient then additional sources of electronic memory 104 may be accessed or the amount of electronic memory 104 may be augmented. The amount of needed memory capacity may vary with time as the buffers 212 for particular files are maintained until the file associated with the buffer 212 is completed, upon which time the memory cells associated with the buffer 212 may be released to be allocated to different files and/or different buffers 212. Thus, the controller 102, for instance, may identify a maximum needed memory capacity and anticipate potential shortfalls, upon which additional memory or storage resources may be accessed or the accessing of data from the electronic storage device 106 temporarily suspended until memory capacity is available.

Similarly, the creation of a buffer 212 may be based on an analysis of the file system 208. For instance, if it is known from the analysis of the file system 208 that a particular file of a particular size will be read from the electronic storage device 106 then a buffer 212 may be created of the particular size to accommodate the file. Alternatively, the creation of buffers 212 may be ad hoc based on the acquisition of data associated with a new file or may be predetermined, with data associated with new files assigned to an empty buffer 212 as the data is obtained. Thus, a buffer 212 may be physically allocated within the electronic memory 104 or may simply be understood as the collection of memory cells that happen to include the data associated with a particular file that has been accessed from the electronic storage device 106.

Where buffers 212 are specifically allocated to a particular file, the blocks 204 of the file may include dedicated memory space in the electronic memory 104. Thus, in the illustrated example, File 1 may include memory space for one (1) block 204, File 2 may include memory space for three (3) blocks, and so forth. In particular, each block 204 may include dedicated space. Thus, block $2_1$ of File 2 may have dedicated memory space into which the data of block $2_1$ is stored upon being read from the electronic storage device 106.

Various alternative sorting and storing methods may also be utilized in the collection of complete files in the electronic memory 104 from the electronic storage device 106, and in various embodiments not all of a file is necessarily stored in the electronic memory 104 in the event that another source of relatively fast electronic memory is available for storage of files and pieces of files. Thus, the controller 102 may, in various examples, utilize multiple electronic memory resources either locally or remotely to collect data as accessed and read from the electronic data storage 106. In various examples, the controller 102 may favor certain memory resources, such as memory resources with larger capacity or faster access times.

Further, optionally, because the size of the media device is known, files can be pre-allocated to the second electronic storage device 110 to create a duplicate of the first electronic storage device 106, e.g., to create an "image". As blocks 204 are read off of the first electronic storage device 106, the blocks 204 and/or the associated data can be written into the image on the second electronic storage device 110. It is noted that if the file system 208 is read specifically, such as to form the segments 210, then the file system 208 may also be specifically stored to the image or, in various examples, stored external to but still accessible by the second electronic storage device 110.

In various examples, if blocks 204 are read off in segments 210, the blocks 204 may be stored in the second electronic storage device 110 in a sequence that corresponds to the blocks' 204 original position in the consecutive sequence on the storage medium 200 of the first electronic storage device 106. Alternatively or additionally, the image may be created or stored in a format different from that of the first electronic storage device 106, such as in a database or compressed according to a compression scheme. Alternatively or additionally, blocks 204 may be stored to the image on the second electronic storage device 110 in the order in which the blocks 204 were accessed. In such an example, the image would not be a direct copy of the first electronic storage device 106 but rather would reflect the order in which blocks 204 are accessed from the first electronic storage device 106.

Figure 3:
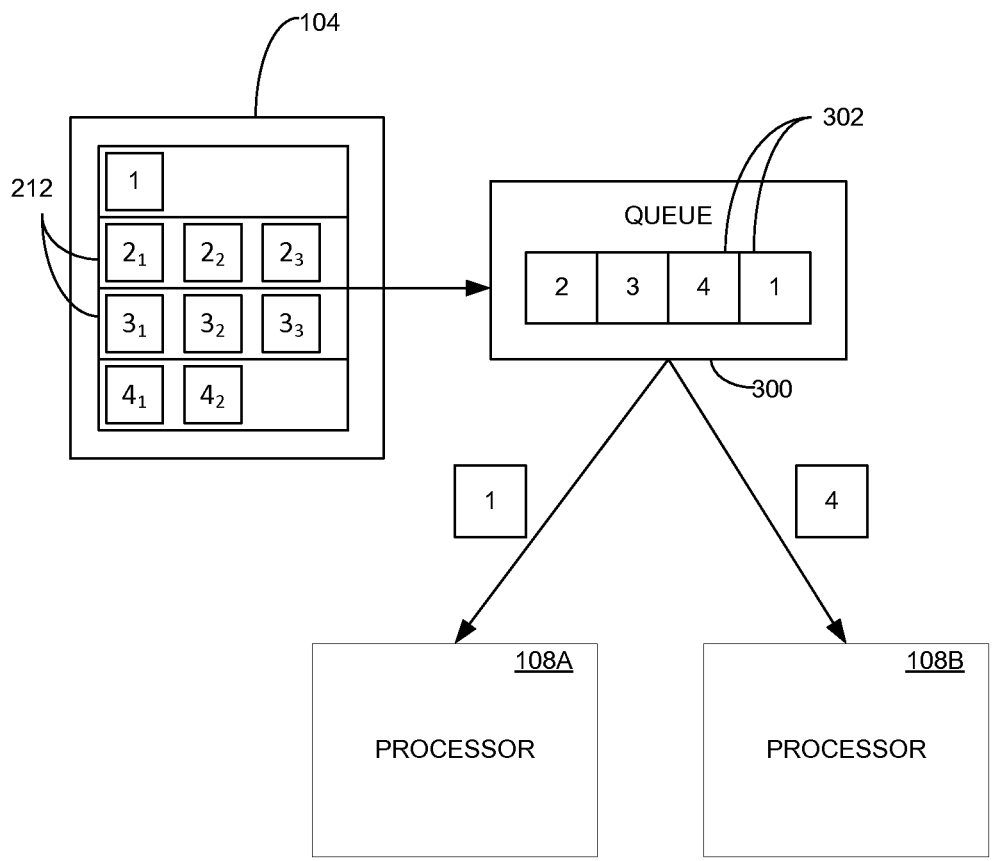
FIG. 3 is an abstract illustration of the transferring of complete files from an electronic memory to one or more processors, in an example embodiment.

FIG. 3 is an abstract illustration of the transferring of complete files from the electronic memory 104 to one or more processors 108, in an example embodiment. While multiple processors 108 are illustrated, it is to be understood that any number of processors 108 with any number of independently programmable cores may be utilized, including a single processor with a single core.

Upon reading a complete file from the electronic storage device 106 and collecting the complete file in the electronic memory 104, the file may be passed to a processor 108 to be processed or analyzed, such as with an agent, a process, or a program. The processing or analysis may be for file-based forensic analysis, as described herein. In an example, the agents are programs running on processors 108 on the same system as the electronic memory 104, using the data in electronic memory 104. In various alternative examples, such agents run on separate systems that receive the complete files over a network. Multiple agents may be run on multiple cores and/or multiple processors 108 in parallel.

Because the agents operating in parallel may operate asynchronously, a system may begin processing the data from the electronic storage device 106 essentially as soon as the first complete file is read off of the electronic storage device 106. Provided sufficient computing resources are available, each subsequent completely-read file may be processed by an agent essentially immediately upon being read off of the disk. Consequently, relatively little lag may result in the processing of data from the media device.

In the illustrated example, the blocks 204 are accessed and read from the electronic storage device 106 as illustrated in FIG. 2. As shown in FIG. 3, as files are completed, the files 300 are added to a queue 302 to be parceled out to the processors 108. In an example, the queue 302 is maintained by the controller 102. Additionally or alternatively, one or more of the processors 108 may maintain the queue 302. When a processor 108 is idle the processor 108 may receive a complete file 300 from the queue 302. In various examples, the queue 302 includes the file 300 itself or includes a pointer to the file 300 which continues to reside in the electronic memory 104 until accessed by the processor 108 that is to process the file 300 and/or by the controller 102 for transmittal to the processor 108.

As illustrated, files 300 are provided to the queue 302 upon being completed in the electronic memory 104. The provision of files 300 to the queue 302 may be essentially immediate upon completion of the file 300 in the electronic memory 104. Essentially immediate may be understood to allow for relatively minor or trivial tasks to be completed ahead of providing the file 300 to the queue 302 but to nevertheless occur very shortly after completion of the file 300.

The queue 302 may be optional, particularly where the processor 108 may not be able to handle files 300 immediately upon completion in the electronic memory 104. Where enough processing power is available because, for instance, of one or more relatively powerful processors 108 or because of an adequate number of processors 108, processing may be sufficient for files 300 to be sent either immediately and directly to the processors 108 or may be accessed by the processors 108 essentially immediately upon being placed in the queue 302. As such, the provision of completed files 300 to the processors 108 themselves may be effectively immediate upon completion of the files 300 in the electronic memory.

In the simplified illustrated example, File 1 is completed and provided to the queue 302 and then on to the processor 108A. Provision of the file to the processor 108A may be effectively immediate upon completion of the file. The processor 108A may then commence performing an operation on File 1, as disclosed herein. File 4 is then the next file to be completed and is provided to the queue 302 and then to the processor 108B which begins performing an operation of File 4. File 3 is the next file to be completed and is provided to the queue 302. If either of the processors 108A, 108B has completed their operations on Files 1 and 4, respectively, and has become idle then the idle processor 108A, 108B may access File 3 effectively immediately upon the completion of File 3. If the processors 108A and 108B are not idle then File 3 remains in the queue 302 until one of the processors 108 becomes available and accesses File 3. Finally File 2 is completed and is provided to the queue 302 where it may be accessed by an available processor 108 following the accessing of File 3.

Figure 4:
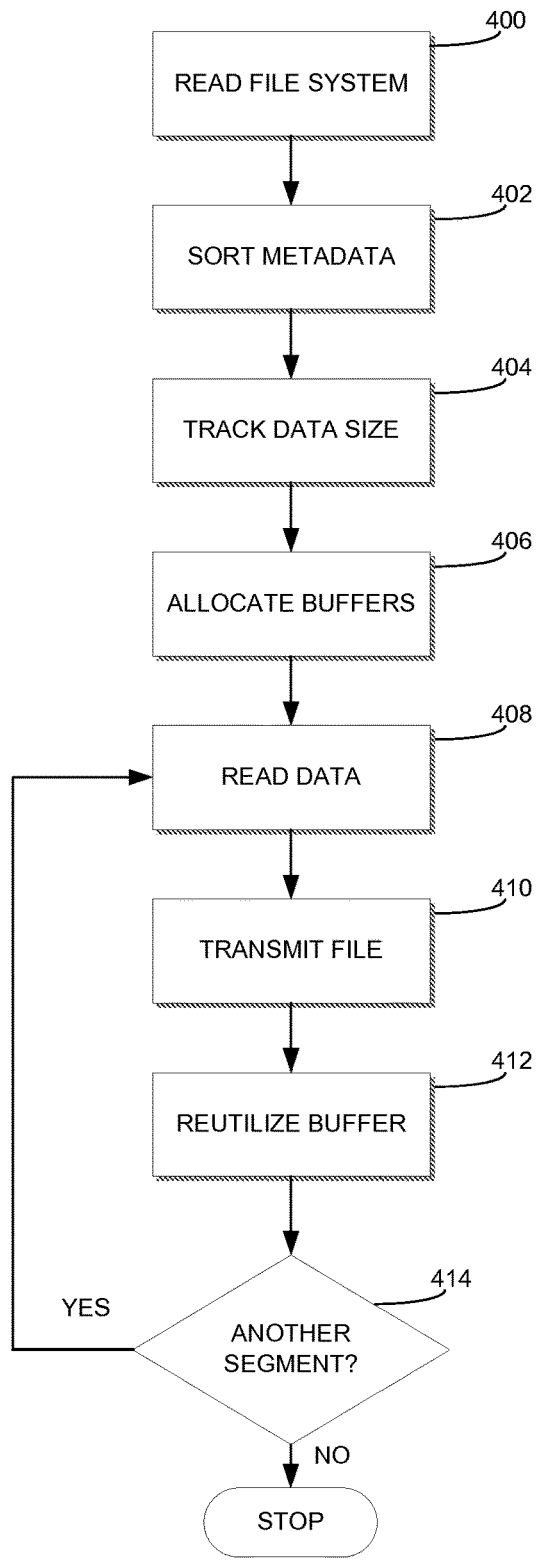
FIG. 4 is a flowchart for accessing data from an electronic storage device, in an example embodiment.

FIG. 4 is a flowchart for accessing data from an electronic storage device, in an example embodiment. The flowchart may describe the actions in FIGS. 2 and 3 as well as be generally applicable to the various systems and processes described herein.

At 400, the file system 208 and metadata included therein is optionally read from the electronic storage device 106 with a read operation. Such a read operation, which may accompany some seeking and which may, in the an illustrative example, include approximately one hundred (100) megabytes of data, may help identify the names of files, timestamps, permissions, and where such files exist on the electronic storage device 106.

At 402, the metadata of the file system 208 is optionally sorted by location of the corresponding blocks 204 on the storage medium 200.

At 404, a total amount and/or size of data is tracked between the start of a file 300 and the end of the file 300 on the storage medium 200. Such tracking may include intervening data from other files 300 on the storage medium 200. Thus, in the illustrative example of FIGS. 2 and 3, there are eight (8) blocks between the start of File 2, i.e., block $2_1$ and the end of File 2, i.e., block $2_3$ (i.e., blocks $2_1$, $3_2$, $4_1$, $2_2$, $3_1$, $4_2$, $3_3$, and $2_3$). Based on the tracking, the disk may be divided into segments 210, such as a relatively small number of relatively large sections. Priorities may be assigned to various sections 210 based on a priority of files 300 having blocks 204 included in the respective segments 210.

At 406, buffers 212 may optionally be allocated in the electronic memory 104, such as based on the file system metadata analysis. Optionally, buffers 212 may be created as needed during reading of data from the electronic storage device 106.

At 408, data is read from the start of the electronic storage device 106 or, in various examples, from the start of a high or highest-priority section 210. As blocks of data 204 are read from the disk stream, the blocks 204 are placed in an appropriate buffer 212 based on the file 300 to which the block 204 corresponds. By way of example, when the block 204 corresponding to File 1 is read the block 204 is stored in the File 1 buffer 212. When the block corresponding to File $2_1$ is read it is stored in the File 2 buffer 212, and so forth.

At 410, when a complete file 300 is read from the disk stream and assembled in its corresponding buffer 212, the complete file 300 is transmitted to a processor 108 and/or an agent associated with the processor 108 for processing. Thus, as soon as the block 204 for File 1 is read, File 1 is immediate transmitted to an processor 108 for processing, as File 1 is wholly contained in a single block 204. By contrast, File 2 is not transmitted until all of blocks $2_1$, $2_2$, and $2_3$ have been read from the disk stream. As a result, Files 3 and 4, which have all of their blocks read from the disk stream prior to block $2_3$ being read, may be accessed by a processor 108 prior to File 2.

In various examples, multiple processors 108 or a processor 108 with multiple cores is utilized. Each processor 108 or core may handle one or more agents at a time. As a result, processing of individual files 300 may occur in parallel.

At 412, buffers 212 that corresponded to completed and transmitted files 300 may be utilized for subsequently read files 300.

At 414, in examples in which the electronic storage device 106 was divided into segments 210, upon completion of one segment 210, operations 408-412 may be repeated until all of the segments 210 have been read. In examples in which blocks 204 corresponding to the same file 300 cross multiple segments 210, the buffer 212 for a file may not be cleared until all of the blocks 204 for the file 300 have been read from the various segments 210 including the file 300.

Figure 5:
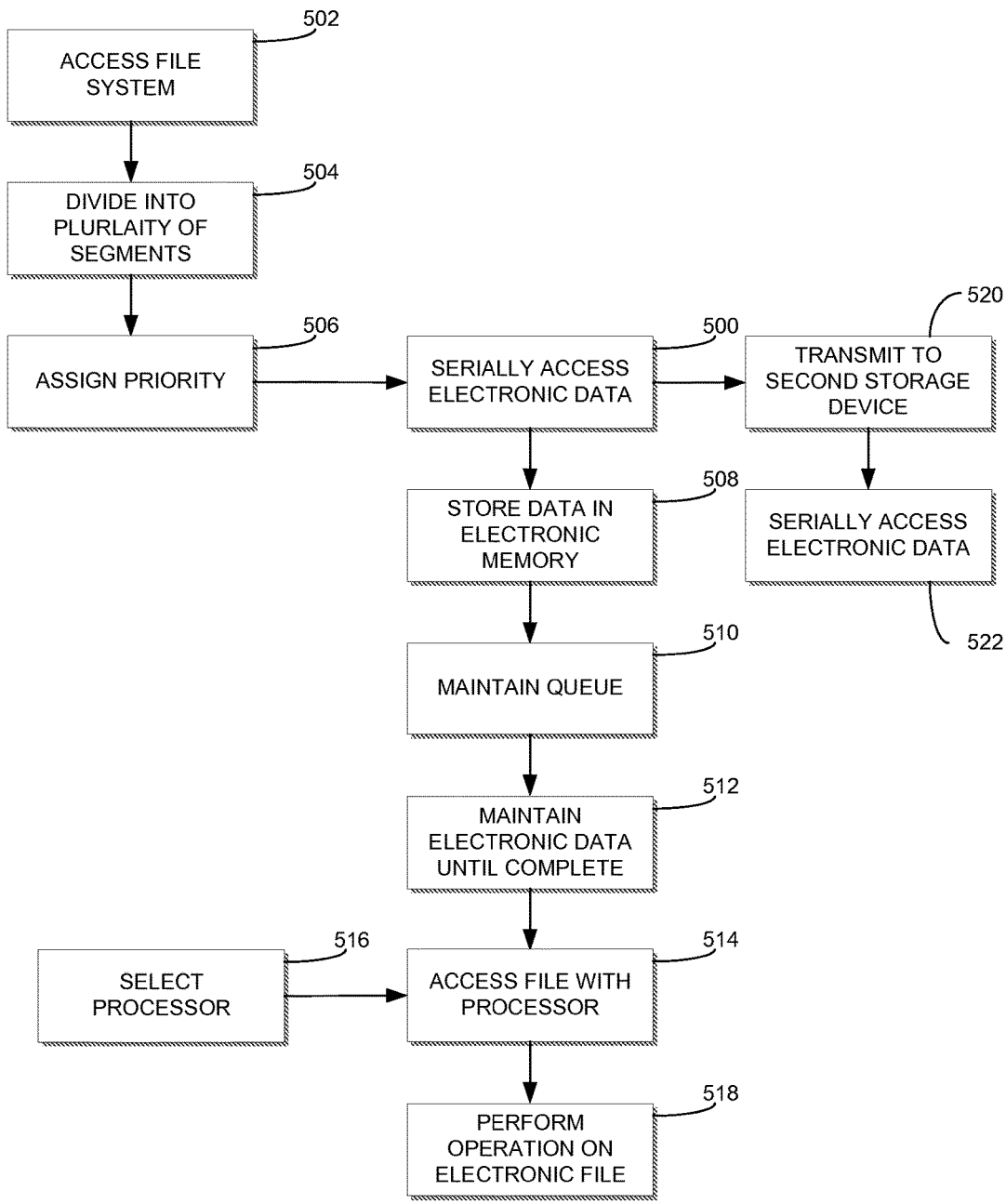
FIG. 5 is a flowchart for accessing data on a file processing from block devices, in an example embodiment.

FIG. 5 is a flowchart for accessing data on a file processing from block devices, in an example embodiment.

At 500, the electronic storage device is caused, with a controller, to serially access and transmit to an electronic memory, according to a consecutive sequence by which electronic data corresponding to ones of a plurality of electronic files is stored on a storage medium of the electronic storage device, at least some electronic data stored on the electronic storage device. The electronic memory is configured to store electronic data. The electronic storage device is configured to access electronic data at a slower rate than the electronic memory. In an example, the electronic storage device is a block device.

At 502, the electronic storage optionally includes a file system having metadata of at least some of the files stored in the electronic storage and the controller accesses the file system.

At 504, the controller optionally divides an electronic storage into a plurality of segments, each of the plurality of segments including a sub-portion of the electronic data storage locations, each of the electronic data storage locations corresponding to one of the plurality of segments. In an example, the controller divides the electronic storage into the plurality of segments based, at least in part, on the metadata. The controller is further configured to cause the electronic storage device to serially access and transmit electronic data stored within a first one of the plurality of segments and then serially access and transmit electronic data within a second one of the plurality of segments.

At 506, a priority is optionally assigned, with the controller, to at least some of the plurality of segments and wherein the first one of the plurality of segments has a higher priority than the second one of the plurality of segments and wherein the controller is configured to access the first one of the plurality of segments before the second one of the plurality of segments based on the first one of the plurality of segments having the higher priority than the second one of the plurality of segments. In an example, the priority is assigned based, at least in part, on the metadata.

At 508, the electronic memory is caused, with the controller, to store in the electronic memory the electronic data as received such that electronic data corresponding to each file of the plurality of files is stored so that the electronic data of the file forms a complete file.

At 510, the controller optionally maintains a queue of ones of the plurality of files for which all of the electronic data has been stored in the electronic memory.

At 512, electronic memory is caused, with the controller, to maintain the electronic data corresponding to each one of the plurality of electronic files as received from the electronic storage until all electronic data associated with the one of the plurality of files is received by the electronic memory.

At 514, a processor is caused, with the controller, to access the one of the plurality of files from the electronic memory upon all electronic data associated with the one of the plurality of files having been stored in the electronic memory. In an example, the controller is configured to cause the processor to access the one of the plurality of files substantially immediately upon all of the electronic data corresponding to the one of the plurality of files having been received by the electronic memory.

At 516, the processor is optionally one of a plurality of processors and the controller selects one of the plurality of processors to access the one of the plurality of files. In an example, controller selects the one of the plurality of processors to access the one of the plurality of files based on the one of the plurality of processors not currently processing another one of the plurality of files. In an example, the controller causes the one of the plurality of processors not currently processing another one of the plurality of files to access one of the plurality of files from the queue.

At 518, the processor is caused, with the controller, to perform an operation upon at least some the electronic data of the one of the plurality of files.

At 520, the first electronic storage device is optionally caused, with the controller, to serially access and transmit to the electronic memory and to a second electronic storage device, according to the consecutive sequence, at least some electronic data stored on the electronic storage device.

Figure 6:
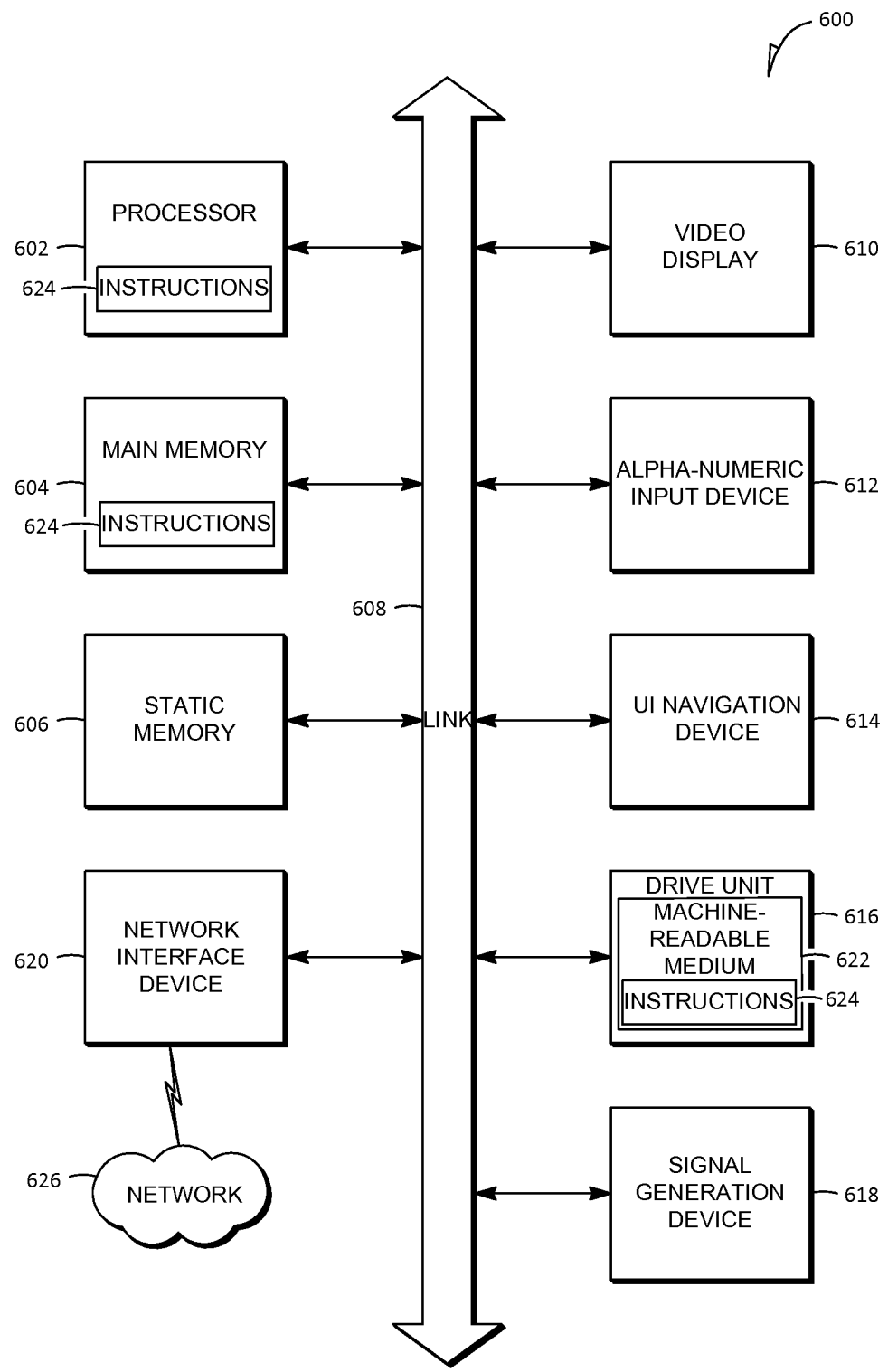
FIG. 6 is a block diagram illustrating components of a machine.

At 522, the second electronic storage device is optionally caused, by the controller, to store, according to the consecutive sequence, the at least some electronic data to create, at least in part, a copy of the first electronic storage device FIG. 6 is a block diagram illustrating components of a machine 600, according to some example examples, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative examples, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), rewriteable read-only memory (ROM), buffer memory, flash memory, and cache memory. While the machine-readable medium 622 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system, comprising:
an electronic memory configured to store electronic data; and
a controller communicatively coupled to the electronic memory and to an electronic storage device, wherein
the electronic storage device comprises a plurality of memory blocks arranged in a first sequence on an electronic storage medium, wherein
a plurality of files is stored to the plurality of memory blocks, at least a portion of the plurality of files each being stored to two or more respective memory blocks which are non-contiguous according to the first sequence, and
the electronic storage device accesses the plurality of memory blocks serially;
wherein the controller is configured to
identify a plurality of locations of memory blocks corresponding to the plurality of files, the plurality of locations including, for each file of the plurality of files, a respective set of memory locations,
divide the plurality of memory locations into a plurality of segments, each segment of at least a portion of the plurality of segments comprising a plurality of memory locations corresponding to contiguous memory blocks of the plurality of memory blocks according to the first sequence, wherein
one or more files of the plurality of files are divided, respectively, among two or more segments of the plurality of segments, and
each of the plurality of segments includes an assigned priority such that higher priority segments are accessed before lower priority segments, wherein the assigned priority for each of the plurality of segments is determined from segment mapping data stored in one or more of the plurality of memory blocks,
cause the electronic storage device to serially access and transmit, to the electronic memory, electronic data corresponding to each of the plurality of segments such that, during transmission, a portion of a first file of the plurality of files and a portion of a second file of the plurality of files will be transmitted prior to complete transmission of either the first file or the second file,
cause the electronic memory, upon receipt, to store in the electronic memory the transmitted electronic data from each segment of the plurality of segments,
during transmission and storage, for each segment of the plurality of segments, monitor storage of the electronic data corresponding to each respective file of the plurality of files to determine completion of storage, by the electronic memory, of electronic data corresponding to the set of memory locations for each file of the plurality of files,
upon determining storage of the electronic data corresponding to the set of memory locations for a given file of the plurality of files in its entirety, cause a processor to
access the given file from the electronic memory, and
perform an operation upon at least some of the electronic data of the given file.

2. The system of claim 1, wherein causing the processor to access the given file and perform the operation comprises identifying a selected processor of a plurality of processors to access the given file and perform the operation.

3. The system of claim 2, wherein identifying the selected processor comprises identifying at least one of the plurality of processors as not currently processing another one of the plurality of files.

4. The system of claim 2, wherein:
the controller is further configured to, upon determining storage of the electronic data corresponding to the set of memory locations for the given file, add the given file to a queue, wherein
causing the processor to access the file comprises causing the processor to access the file from the queue.

5. The system of claim 1, further comprising the electronic storage device.

6. The system of claim 1, wherein the electronic storage device is a hard disk.

7. The system of claim 1, wherein the first sequence is a physical sequence on the electronic storage device.

8. The system of claim 1, wherein causing the electronic storage device to serially access and transmit, to the electronic memory, electronic data corresponding to each of the plurality of segments comprises ordering access and transmission of the plurality of segments to minimize seek operations by the electronic storage device.

9. The system of claim 1, wherein performing the operation comprises performing analysis of at least a portion of the given file.

10. The system of claim 1, wherein each segment of the plurality of segments comprises a same number of blocks.

11. The system of claim 1, wherein causing the electronic memory to store the transmitted electronic data comprises causing the electronic memory to store the electronic data in a plurality of buffers, each buffer allocated to a different respective file of the plurality of files.

12. The system of claim 1, wherein the controller is further configured to, upon the processor completing performance of the operation, cause a portion of the electronic memory containing the electronic data of the given file to be available for other use.

13. The system of claim 1, wherein the assigned priority of each of the plurality of segments is based on a number of memory blocks that make up the respective segment such that a first respective segment having a first number of memory blocks has a higher priority than a second respective segment having a second number of memory blocks that is less than the first number of memory blocks.

14. The system of claim 1, wherein each of the plurality of files is stored in one or more of the plurality of segments according to a priority associated with the respective file of the plurality of files such that a first number of files having a highest file priority are stored in one or more of the plurality of segments having a highest segment priority.

15. The system of claim 14, wherein the priority associated with the respective file of the plurality of files is based on at least one of a file size, a file name, and a file type.

16. A method, comprising:
mapping, by an electronic controller, a plurality of locations of memory blocks of an electronic storage device to a plurality of files, wherein
the plurality of locations includes, for each file of the plurality of files, a respective set of memory locations, and for each file of at least one of the plurality of files, the respective set of memory locations comprises at least one non-contiguous pair of memory locations, wherein
the non-contiguous pair of memory locations are non-contiguous according to an access sequence of the electronic storage device;
dividing, by the electronic controller, the plurality of memory locations into a plurality of segments, each segment of the plurality of segments comprising a plurality of memory locations corresponding to contiguous memory blocks of the plurality of memory blocks, wherein
the contiguous memory blocks are contiguous according to an access sequence of the electronic storage device, and
one or more files of the plurality of files are divided, respectively, among two or more segments of the plurality of segments, and
each of the plurality of segments includes an assigned priority such that higher priority segments are accessed before lower priority segments, wherein the assigned priority for each of the plurality of segments is determined from segment mapping data stored in one or more of the plurality of memory blocks;
causing, by the electronic controller, the electronic storage device to serially access and transmit, to an electronic memory, electronic data corresponding to each of the plurality of segments such that, during transmission, a portion of a first file of the plurality of files and a portion of a second file of the plurality of files will be transmitted prior to complete transmission of either the first file or the second file;
causing, by the electronic controller, the electronic memory, upon receipt, to store in the electronic memory the transmitted electronic data from each segment of the plurality of segments;
monitoring, by the electronic controller, receipt of the electronic data to determine completion of storage, by the electronic memory, of electronic data corresponding to the set of memory locations of each file of the plurality of files;
upon determining completion of storage of the electronic data corresponding to the set of memory locations for a given file of the plurality of files in its entirety, causing a selected processor of at least one processor to access the given file from the electronic memory, and process at least some of the electronic data of the given file in accordance with a program.

17. The method of claim 16, wherein the program is a forensic analysis program.

18. The method of claim 16, wherein causing the selected processor to process the at least some of the electronic data comprises causing a first processor of the at least one processor to process the at least some of the electronic data of a first file of the plurality of files in parallel with a second processor processing at least some of the electronic data of a second file of the plurality of files.

19. The method of claim 16, further comprising causing storage, by the electronic controller, of each segment of the plurality of segments to a second electronic storage device.

* * * * *